June 19, 1928.  1,673,972
J. DOWLING
DISH WASHING AND DRYING MACHINE
Filed March 10, 1926
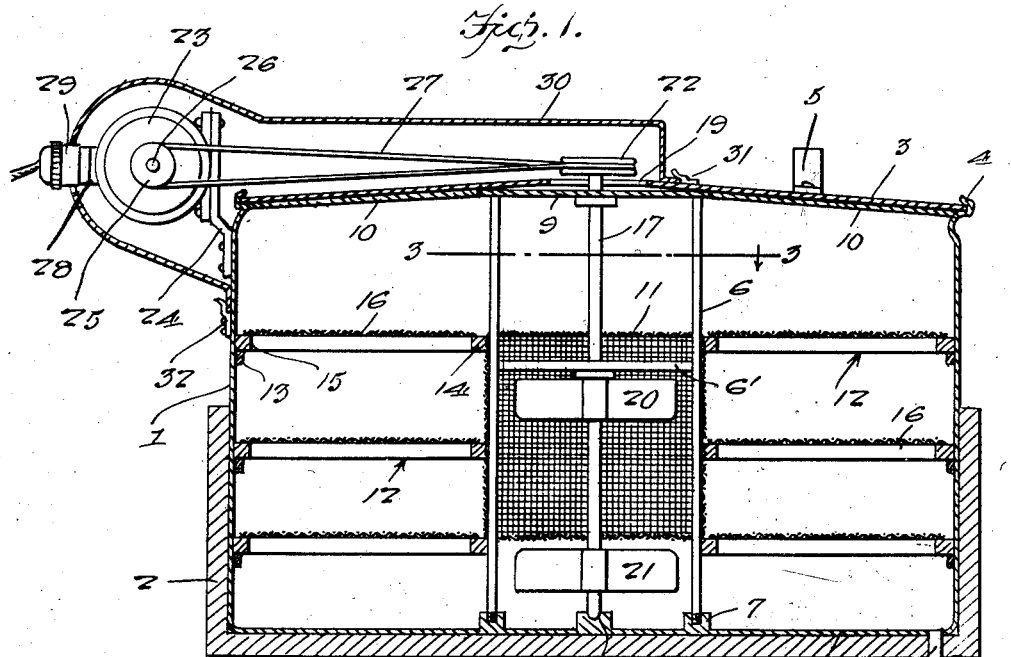
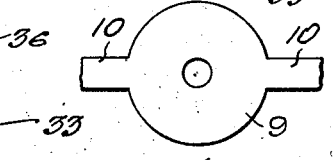
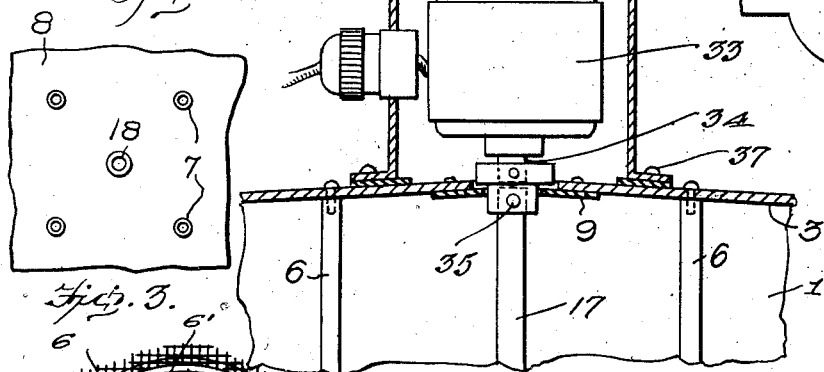
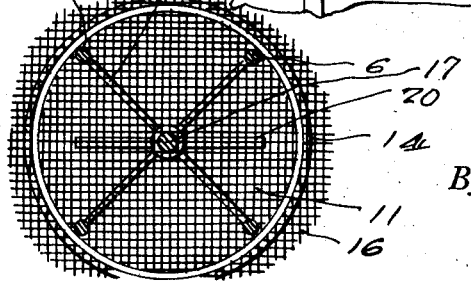
Inventor
J. Dowling
By Clarence A. O'Brien
Attorney Patented June 19, 1928.

1,673,972

UNITED STATES PATENT OFFICE.

JOSEPH DOWLING, OF CHICAGO, ILLINOIS.

DISH WASHING AND DRYING MACHINE.

Application filed March 10, 1926. Serial No. 93,664.

The present invention relates to improvements in dish washing machines, and has for its principal object to provide a highly novel yet simple machine for facilitating the washing and drying of dishes without necessitating the employing of manual labor.

A further object is to provide a dish washing machine which will enable dishes to be thoroughly washed and rinsed and also dried in a simple and efficient manner, the machine being adapted to be operated by an electric motor.

A further object is to provide a dish washing machine of the above mentioned character which is simple in construction, inexpensive, strong and durable, and further well adapted to the purpose for which it is designed.

Other objects and advantages of the invention will become apparent as the nature of the invention will be better understood and when taken in connection with the accompanying drawing.

In the accompanying drawing forming a part of this application and in which like numerals designate like parts throughout the several views:

Figure 1 is a vertical sectional view through the washing machine embodying my invention, showing one form of driving mechanism.

Figure 2 is a detail view illustrating another form of motor operated drive for the rotatable shaft which carries the agitator blade.

Figure 3 is a sectional view taken approximately on line 3—3 of Figure 1 looking in the direction of the arrows.

Figure 4 is a fragmentary bottom plan view of the circular disc and the lateral extension formed thereon, and Figure 5 is a fragmentary top plan view of the bottom of the receptacle showing the arrangement of the sockets and the central bearing thereon.

In the drawing wherein for the purpose of illustration is shown the preferred embodiment of my invention, the numeral 1 designates a relatively large metallic cylindrical receptacle which is adapted to have its lower portion resting in the wooden base 2 in the manner clearly shown in Figure 1. The top of the receptacle 1 is open and a removable lid or cover 3 is provided therefor, suitable spring clips such as are shown at 4 being provided at the upper edges of the receptacle for engagement with the outer edge of the cover for retaining the same in its closed position on the receptacle.

A suitable handle such as is shown at 5 is secured on the cover to facilitate the handling thereof.

Arranged centrally within the receptacle 1 are the four vertical posts or rods 6, the same being arranged in substantially circular formation as is clearly illustrated in Figure 3. The lower ends of these posts or rods 6 are threaded in suitable sockets 7 provided therefor in the bottom 8 of the receptacle, and the upper ends of these rods are secured to a circular disc 9 which disc is disposed below the cover 3 and is provided with the lateral extensions 10 which are formed on the opposite sides of the disc and the outer ends of these extensions are rigidly associated with the upper portion of the receptacle at diametrically opposite points. In this manner, the posts or rods 6 are maintained in a rigid position within the receptacle. Suitable bracing means such as is shown at 6' is associated with the posts 6 and the shaft 17.

A cylindrical screen member 11 which is closed at its top and bottom extends around the intermediate portion of the spaced posts or rods 6, and adapted to be secured thereto by any appropriate fastening means. The purpose of the cylindrical screen member 11 will be hereinafter more fully described.

A series of dish supporting trays of foraminous material and designated generally by the numeral 12 are adapted to be removably supported within the receptacle 1 around the posts or rods 6 and suitable lugs or shoulders such as are shown at 13 are arranged on the inner side or wall of the receptacle in vertically spaced relation to provide supporting means for the dish supporting members. As is clearly illustrated in Figure 1, the dish supporting trays are in the form of a pair of concentric rings, the inner rings 14 being adapted to be disposed around the posts or rods 6, while the outer ring 15 is disposed adjacent the inner wall of the receptacle and suitable screening 16 is secured to the upper faces of the concentric rings. This construction will permit the dish supporting trays to be readily and easily handled in removing or inserting the same with respect to the receptacle. By arranging the tray supporting lugs or shoulders 13 in the manner clearly shown in Figure 1, sufficient space will be provided between the several trays to accommodate dishes of various shapes and sizes.

Also forming a part of the present invention is the vertically arranged rotatable shaft 17, the same having its lower end journaled in the bearing 18 which is located in the center of the bottom 8 of the receptacle 1 and this shaft extends upwardly through the cylindrical screen member 11 and is equally spaced from the several posts or rods 6. The upper end of the shaft 17 extends through the stationary member 9 and through a suitable opening 19 provided therefor in the lid or cover 3. A pair of agitator or circulator blades 20 and 21 are secured on the shaft 17, the blade 20 being mounted on the intermediate portion of the shaft so as to be disposed within the screen cylinder 11, while the other blade 21 is located at a point adjacent the lower end of the shaft.

A pulley 22 is secured on the upper end of the shaft 17. The driving mechanism for actuating the shaft 17 comprises an electric motor designated generally by the numeral 23, the same being adapted to be supported on the outer side of the receptacle 1 adjacent the top thereof through the medium of the bracket 24. A pulley 25 is mounted on the outer end of the drive shaft 26 of this electric motor, and a suitable belt 27 is trained over the pulleys 22 and 25, thus providing an operative connection between the motor and the shaft 17 which is to be rotated. The current for operating the motor is supplied from any suitable source, and in the present instance, I have shown the motor as being provided with a plug 28 in which is fitted the detachable plug 29, and the current conducting wires are attached to the plug 29 in the manner well known in the art.

A guard housing 30 is provided for the driving mechanism for the shaft 17 and this housing may be detachably associated with the cover 3, and the receptacle 1 through the medium of the catches shown at 31 and 32.

In Figure 2 of the drawing, a modification of the shaft and driving mechanism is illustrated and to this end, a direct drive means is provided, the same comprising an electric motor 33 which has its drive shaft 34 arranged in vertical alignment with the shaft 17 and is operatively connected with the upper end thereof by any suitable coupling such as is shown generally at 35. A housing 36 is provided for the motor 33 and may be secured on the top of the central portion of the lid or cover 3 in any suitable manner as at 37.

The operation of my improved dish washing and drying machine may be briefly stated as follows: The dishes which are to be washed are placed in the receptacle on the several trays, it being understood of course that the lowermost tray is first filled with dishes before the next tray is placed in the receptacle. After all the dishes have been placed in the receptacle, the lid 3 is clamped on the open top of the receptacle, it being understood of course that the receptacle is filled a little over half full with water before the cover is placed on the receptacle. The plug 29 is then connected to the plug 28 of the motor 23 and when the current is turned on, the shaft 17 will be caused to rotate and simultaneously actuating the circulating blades 20 and 21, the operation of the blades 20 and 21 will circulate the water within the receptacle through the screened cylinder 11 so that the dishes will be thoroughly washed, and rinsed. The screen 11 will prevent the dishes from coming in contact with the blades 20 and 21 so as not to impede the operation of the blades to circulate the water within the receptacle.

In order that the dishes which have been washed and rinsed, may be dried, I provide a drain 38, the same having communication with the bottom of the receptacle, and by opening the valve 39 which is associated with the drain pipe 38, all of the water in the receptacle will be drained therefrom. After the water has been drained off, the motor 23 is again operated, and when the shaft 17 and the circulating blades 20 and 21 are rotated, the blades will circulate the air within the receptacle to effect the quick and easy drying of the dishes.

The dishes may then be removed from the receptacle and will be thoroughly cleaned.

The simplicity of my improved machine will enable a large quantity of dishes to be accommodated at one time, and will furthermore wash and dry the same in an expeditious manner, and will also obviate the necessity of having to employ manual labor in performing the work.

The parts of my improved machine are so constructed as to enable the same to be readily assembled or disassembled for cleaning purposes.

While I have shown the preferred form of my invention it is to be understood that minor changes in the size, shape and arrangement of parts may be resorted to without departing from the spirit of the invention, and the scope of the appended claim.

Having thus described the invention, what I claim as new and desire to secure by Letters Patent is:—

In a dish washing machine, a stationary receptacle open at its top, a cover therefor, a circular disc arranged centrally in the receptacle beneath the cover, lateral extensions formed on opposite sides of the circular disc, the outer ends of said extensions being secured to the respective sides of the receptacle, socket forming members arranged in annular spaced relation in the bottom of the receptacle, a bearing arranged centrally in the bottom of the receptacle and within the confines of said socket members, a vertical shaft journaled at its lower end in said bearing, the upper end thereof extending centrally through the disc and said cover, means on the upper end of the shaft for effecting the rotation thereof, water circulating blades secured on the intermediate portion of the shaft, a plurality of vertically arranged rods supported at their lower ends within the respective socket members, the upper ends of said rods being secured to the disc and disposed in circular formation around the shaft and the blades carried thereby to provide an annular disc receiving chamber, a cylindrical screen encircling the rods, and braces extending between the shaft and said rod.

In testimony whereof I affix my signature.

JOSEPH DOWLING.